(12) United States Patent
Haag et al.

(10) Patent No.: US 10,875,512 B2
(45) Date of Patent: Dec. 29, 2020

(54) METHOD FOR BOOSTING THE BRAKE POWER IN AN ELECTRONICALLY SLIP-CONTROLLABLE VEHICLE BRAKE SYSTEM, AS WELL AS AN ELECTRONICALLY SLIP-CONTROLLABLE VEHICLE BRAKE SYSTEM

(71) Applicant: Robert Bosch GmbH, Stuttgart (DE)

(72) Inventors: Florian Haag, Untergruppenbach (DE); Herbert Vollert, Vaihingen/Enz (DE); Jens Kolarsky, Bietigheim/Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 16/471,386

(22) PCT Filed: Oct. 19, 2017

(86) PCT No.: PCT/EP2017/076729
§ 371 (c)(1),
(2) Date: Jun. 19, 2019

(87) PCT Pub. No.: WO2018/114092
PCT Pub. Date: Jun. 28, 2018

(65) Prior Publication Data
US 2019/0315326 A1  Oct. 17, 2019

(30) Foreign Application Priority Data
Dec. 21, 2016 (DE) ......................... 10 2016 225 694

(51) Int. Cl.
*B60T 13/14* (2006.01)
*B60T 7/04* (2006.01)
(Continued)

(52) U.S. Cl.
CPC ............ *B60T 13/146* (2013.01); *B60T 7/042* (2013.01); *B60T 8/17616* (2013.01);
(Continued)

(58) Field of Classification Search
CPC . B60T 7/042; B60T 8/17; B60T 8/171; B60T 8/172; B60T 8/174; B60T 8/17616;
(Continued)

(56) References Cited

U.S. PATENT DOCUMENTS 6,533,366 B1 * 3/2003 Barron ..................... B60T 8/346
251/11
7,035,726 B2 * 4/2006 Sakata .................. B60T 8/1755
180/410

(Continued)

FOREIGN PATENT DOCUMENTS

DE 102005035595 A1 2/2007
WO 2009118208 A1 10/2009

OTHER PUBLICATIONS

International Search Report for PCT/EP2017/076729, dated Feb. 13, 2018.

*Primary Examiner* — Thomas W Irvin
(74) *Attorney, Agent, or Firm* — Norton Rose Fulbright US LLP; Gerard Messina

(57) ABSTRACT

A method for boosting a braking force in an electronically slip-controllable vehicle brake system, as well as an electronically slip-controllable vehicle brake system. Vehicle brake systems of this kind are at least equipped with a power brake unit and electronic slip-controllable vehicle brake system. In the case of a malfunction of the power brake unit, the traction-slip control device (92) takes over the boosting. A method for determining a composite signal which is adjusted by controlling a drive of a pressure generator of the slip-controllable vehicle brake system accordingly. To this end, an electronic control unit records two mutually inde- (Continued)

pendent input quantities, converts these input quantities into evaluation signals and sums the evaluation signals mathematically to yield a composite signal. The latter represents a setpoint brake pressure that the slip-controllable vehicle brake system supplies by controlling a pressure generator accordingly.

10 Claims, 3 Drawing Sheets

(51) Int. Cl.
  *B60T 8/1761* (2006.01)
  *B60T 8/40* (2006.01)
  *B60T 8/44* (2006.01)
  *B60T 8/88* (2006.01)
  *B60T 13/66* (2006.01)
  *B60T 13/68* (2006.01)

(52) U.S. Cl.
  CPC ............ *B60T 8/4072* (2013.01); *B60T 8/442* (2013.01); *B60T 8/885* (2013.01); *B60T 13/662* (2013.01); *B60T 13/686* (2013.01); *B60T 2201/03* (2013.01); *B60T 2270/402* (2013.01)

(58) Field of Classification Search
  CPC ........ B60T 8/4072; B60T 8/442; B60T 8/885; B60T 13/146; B60T 13/662; B60T 13/686; B60T 2201/03; B60T 2270/402; B60T 2220/04
  See application file for complete search history.

(56) References Cited

U.S. PATENT DOCUMENTS

| | | | |
|---|---|---|---|
| 7,686,404 B2* | 3/2010 | Lehmann | B60T 8/4086 303/114.3 |
| 7,885,751 B2* | 2/2011 | Otake | B60T 8/1755 701/96 |
| 8,510,009 B2* | 8/2013 | Willmann | B60T 7/042 701/78 |
| 8,777,335 B2* | 7/2014 | Furuyama | B60T 17/22 303/155 |
| 9,050,949 B2* | 6/2015 | Miyazaki | B60T 8/4872 |
| 9,254,842 B2* | 2/2016 | Ishida | B60W 30/0956 |
| 10,407,039 B2* | 9/2019 | Kishi | B60T 13/686 |
| 2005/0216157 A1* | 9/2005 | Sakata | B60T 8/1755 701/42 |
| 2006/0186729 A1* | 8/2006 | Lehmann | B60T 8/442 303/11 |
| 2008/0201049 A1* | 8/2008 | Bodmann | B60T 8/4872 701/70 |
| 2008/0284240 A1* | 11/2008 | Jeong | B60T 7/12 303/11 |
| 2009/0281704 A1* | 11/2009 | Otake | B60T 17/22 701/96 |
| 2011/0029215 A1* | 2/2011 | Willmann | B60T 8/4872 701/78 |
| 2011/0241417 A1 | 10/2011 | Miyazaki et al. | |
| 2012/0007418 A1* | 1/2012 | Furuyama | B60T 8/442 303/11 |
| 2015/0134218 A1* | 5/2015 | Ishida | B60W 30/12 701/70 |
| 2018/0105156 A1* | 4/2018 | Kishi | B60T 8/4077 |
| 2020/0223408 A1* | 7/2020 | Goto | B60T 8/3255 |
| 2020/0262399 A1* | 8/2020 | Yokoyama | B60T 8/00 |

* cited by examiner

METHOD FOR BOOSTING THE BRAKE POWER IN AN ELECTRONICALLY SLIP-CONTROLLABLE VEHICLE BRAKE SYSTEM, AS WELL AS AN ELECTRONICALLY SLIP-CONTROLLABLE VEHICLE BRAKE SYSTEM

FIELD OF THE INVENTION

The present invention relates to a method for boosting the braking force in an electronically slip-controllable vehicle brake system, and to an electronically slip-controllable vehicle brake system.

BACKGROUND INFORMATION

Electronically slip-controllable vehicle brake systems are reasonably well known from the related art; they are often also referred to as ABS, ASC or ESP brake systems. In this regard, reference is made, for example, to the German Published Patent Application No. 10 2005 035 595.

The basic design of this known slip-controllable vehicle brake system underlies the present invention. It is, therefore, shown in FIG. 3 for the sake of completeness.

The slip-controllable vehicle brake system is equipped with an actuating device 80, for example, in the form of a conventional brake pedal, via which the driver inputs his/her brake intention as needed. Actuating device 80 is coupled exemplarily to a pneumatic power brake unit 82, which boosts the driver-applied actuating force with the aid of pneumatic assistance and thus enhances the braking comfort. Apart from pneumatic power brake units, hydraulic or electromechanical power brake units are known. In particular, the latter can also be controlled independently of the driver actuation, as they have electronically controllable actuators that are suited for this purpose.

In the case of the cited related art, brake power unit 82 of the vehicle brake system acts on a brake master cylinder 84. For that purpose, this brake master cylinder is equipped with at least one cylinder piston (not discernible) which limits the pressure chamber and builds up a brake pressure therein by displacement. Connected to brake master cylinder 84 are a plurality of wheel brakes 86, which are thereby pressurized by the brake pressure of brake master cylinder 84 and ultimately brake the respective associated wheels of the vehicle.

Connected between master cylinder 84 and wheel brake 86 is an electronic traction-slip control device 92. The latter includes electronically controllable components, inter alia, a drivable pressure generator 88, as well as the control valves that modulate the braking pressure of the wheel brake. These components are controlled by an electronic control unit 90, which adapts the braking pressure of wheel brakes 86 to the slip conditions prevailing on the associated wheel. These conditions are recorded, for example, by speed sensors on the wheels that feed the signals thereof to electronic control unit 90. Electronic control unit 90 processes these input signals into actuation signals and, thus, in turn, controls the above explained components of slip control system 92. Traction-slip control device 92 distributes the driver-applied brake pressure and/or the power brake unit wheel-specifically to associated wheel brakes 86.

Apart from that, related art traction-slip control devices 92 can also generate braking pressure actively, i.e., independently of the driver, and wheel-specifically to respective wheel brakes 86.

Should the power brake unit fail due to a malfunction in a thus equipped vehicle brake system, the traction-slip control device can take over or compensate the brake boost. This is possible because, in spite of a failure of the power brake unit or of the boosting of the braking force, the driver, by actuating the brake pedal, is still able to build up a brake pressure in the brake master cylinder. This brake pressure is proportional to the driver's braking intention and can be recorded as an input variable by the electronic control unit. From this input variable, the electronic control unit determines a control signal for the pressure generator of the slip control device; accordingly, the latter pressure generator supplying a brake pressure that is higher than that generated by the driver. The brake pressure and the braking force are mutually proportional.

However, there are disadvantages to a brake boost by the traction-slip control device. Since the brake pressure prevailing in the pressure chamber of the brake master cylinder is used as a controlled variable, the brake boost can only take place when the driver has built up a brake pressure in the master cylinder. However, without an active brake booster, the force that the driver requires for this purpose is naturally significantly higher than when brake boost is present. As a result, considerable initial force is needed to achieve a braking action, and the braking comfort is reduced correspondingly.

Moreover, in response to fluctuations in the pressure signal due to different malfunctions, the hydraulic brake boost can only be activated by the traction-slip control device when a limit value of the master cylinder pressure is exceeded. This limit value is calculated in such a way that the driver actuates the brake pedal in any case in order to exceed it. This ensures that, under no circumstances, is pressure built up by the traction-slip control device without there being a braking intention on the part of the driver.

Thus, to activate the hydraulic brake boost, the driver must overcome all mechanical forces that oppose an actuation of the actuation unit, and in addition thereto, must exert the force needed to generate a brake pressure at the level of the limit value.

Finally, it should be noted that electronic switch devices are also known from the related art which, as a function of a driver-applied actuating force and/or as a function of an actuating travel of the actuating device, generate a binary signal that can be fed to the electronic control unit of the traction-slip control device for further processing. Switch devices of this kind may be thereby designed in such a way that the signal is generated independently of the availability of the brake booster. For example, the function of binary switch devices is such that, above a certain applied actuating force or actuating travel, an existing signal is set from 0 to 1 or vice versa from 1 to 0, a signal value change being configured as a step function.

SUMMARY

A method according to the present invention has the advantage over this discussed related art of requiring less initial force for activating a hydraulic boosting of the traction-slip control device and, consequently, of providing the driver with an improved pedal feel, especially when the method is implemented in response to a malfunction in the power brake unit. The proposed method at least partly resorts to already existing sensor signals, is implemented in the electronic control unit, and does not result in any appreciable further constructional outlay.

The present invention is directed to a method that specifies how a setpoint value for a brake pressure is generated from available input signals, which is then set by appropriate electronic control of the pressure generator of the slip control device. For the proposed method, a first input signal, which indicates a braking intention of the driver, and a second input signal, which represents the driver-generated brake pressure in the pressure chamber of the brake master cylinder, is recorded in the electronic control unit and further processed into evaluation signals, which are subsequently summed to yield a cumulative value. The cumulative value corresponds to a brake pressure setpoint value which is converted into a corresponding control signal for the pressure generator.

BRIEF DESCRIPTION OF THE DRAWINGS

With reference to altogether three diagrams, 2a through 2c.

DETAILED DESCRIPTION

Figure 3:
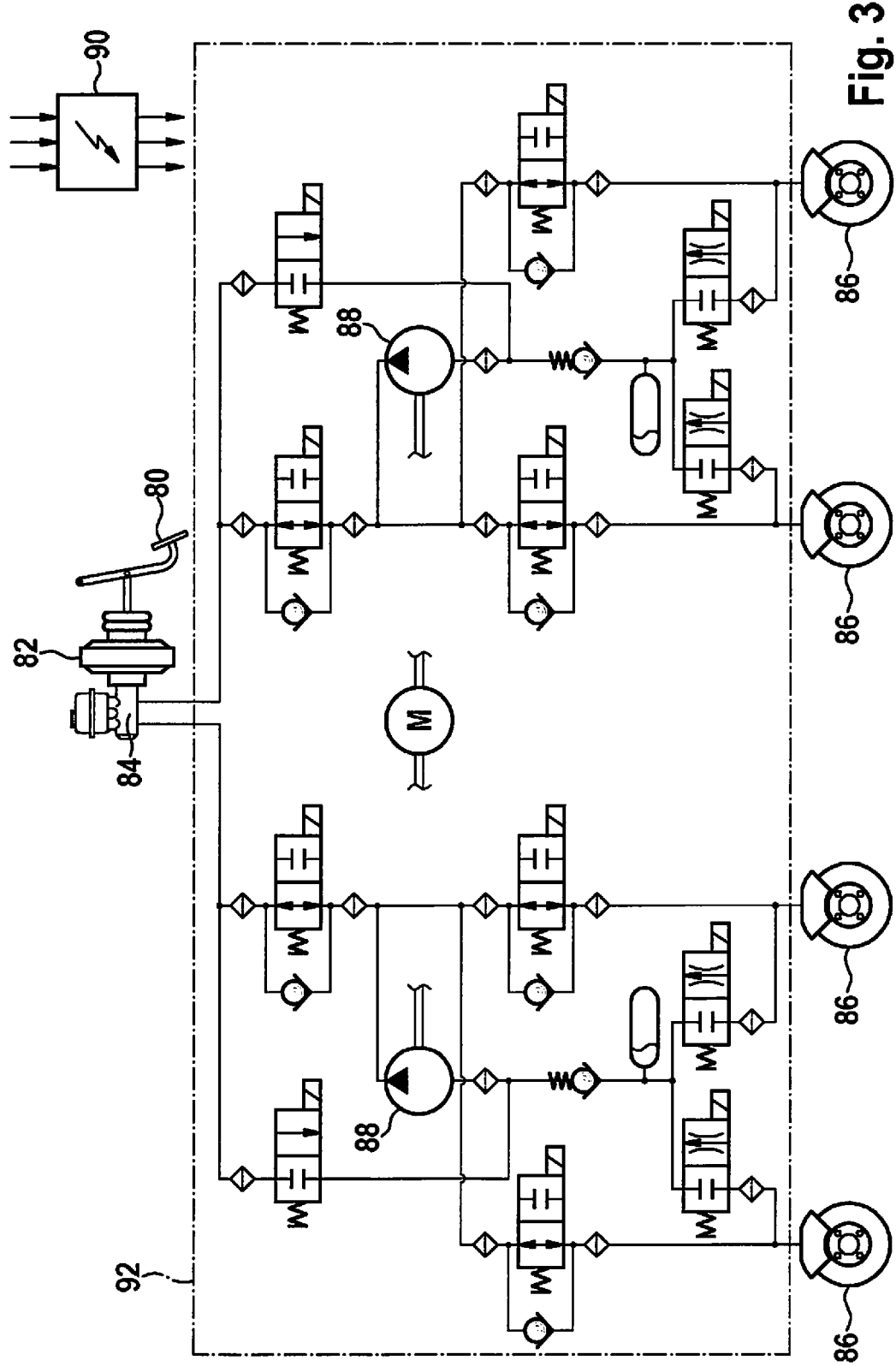
FIG. 3 shows the basic structure of a slip-controllable vehicle brake system underlying the present invention.

The method described in the following is used for a vehicle brake system, which, as explained at the outset and shown in FIG. 3, is at least equipped with an actuating device 80, a power brake unit 82, a brake master cylinder 84, a traction-slip control device 92, and a wheel brake 86 that able to be pressurized with brake pressure.

The method illustrated with reference to FIG. 1 and underlying the present invention is stored in the form of program steps of a computer program in an electronic control unit 90 of a vehicle brake system that is associated with traction-slip control device 92. The beginning or start and end of the method are characterized in FIG. 1 by symbols S and E.

A first step 10 following the start of the method is to check the vehicle brake system with respect to a malfunction or defect in the power brake unit.

This examination may be performed, for example, by ascertaining whether an input means of the power brake unit, via which the power brake unit is able to be acted upon by a driver-applied actuating force, is executing a movement relative to a booster element of the power brake unit that effects a boost of this actuating force. In the case of a pneumatic power brake unit, the input means is an actuating linkage, for example, that is coupled to the brake pedal, and the booster element is a membrane which is able to be acted upon by partial vacuum and is coupled to the actuating linkage.

The input means and the boosting element of the power brake unit move toward one another in undisturbed operation, respectively do not execute any relative movement. Thus if such a relative movement or a travel difference occurs in response to an actuation of the power brake unit, an existing malfunction or defect in the power brake unit may then be inferred from this travel difference.

This travel difference may be ascertained, for example, by the electronic evaluation of signals from position transducers, which, on the one hand, at least indirectly measure a movement of the input means and, on the other hand, a movement of the booster element. At least as far as the actuating device is concerned, an electronically slip-controllable vehicle brake system is already equipped with such a position transducer in order to capture the braking intention of the driver. Since, in the case of an existing defect, the boosting element of the power brake unit is not driven, there is a proportionality between an ascertained travel difference and a braking intention of the driver.

If the examination of the operational reliability of the power brake unit does not yield any existing malfunction, the method is ended in accordance with arrow 11 and restarted at a later time point in time.

However, if an existing operating malfunction of the power brake unit was recognized, it is checked in a subsequent second step 12 whether a braking intention actually exists on the part of the driver. This procedure is necessary to prevent a brake boost from being undertaken by the slip control device, although no braking intention at all of the driver is at hand.

An existing braking intention is inferred, for example, upon exceedance of a predeterminable force or travel minimum value applied by the driver to the actuating device. This may be implemented with the aid of a switch device or position transducer known from the related art. Signals from sensors of this kind may be evaluated relatively simply in the electronic control unit.

In the case that the minimum value is not to be exceeded, the method, as referred to by arrow 13, is likewise interrupted and restarted from the beginning at a later point in time.

Upon exceedance of the minimum value, it is established that a malfunction of the power brake unit is at hand and that the driver has expressed a braking intention.

The aim is then to convert the braking intention into a brake pressure by appropriately controlling the traction-slip control device, without the driver perceiving the malfunction in the power brake unit and/or actuation conditions of the vehicle brake system that deviate significantly from the normal operation.

In this regard, the proposed method is divided into two parallel branches of the method. In both branches of the method, two evaluation signals are generated by the electronic control unit in steps 14 and 16 independently of one another, from which, in a subsequent step 18, a composite signal is determined which represents a brake pressure setpoint value.

Figure 1:
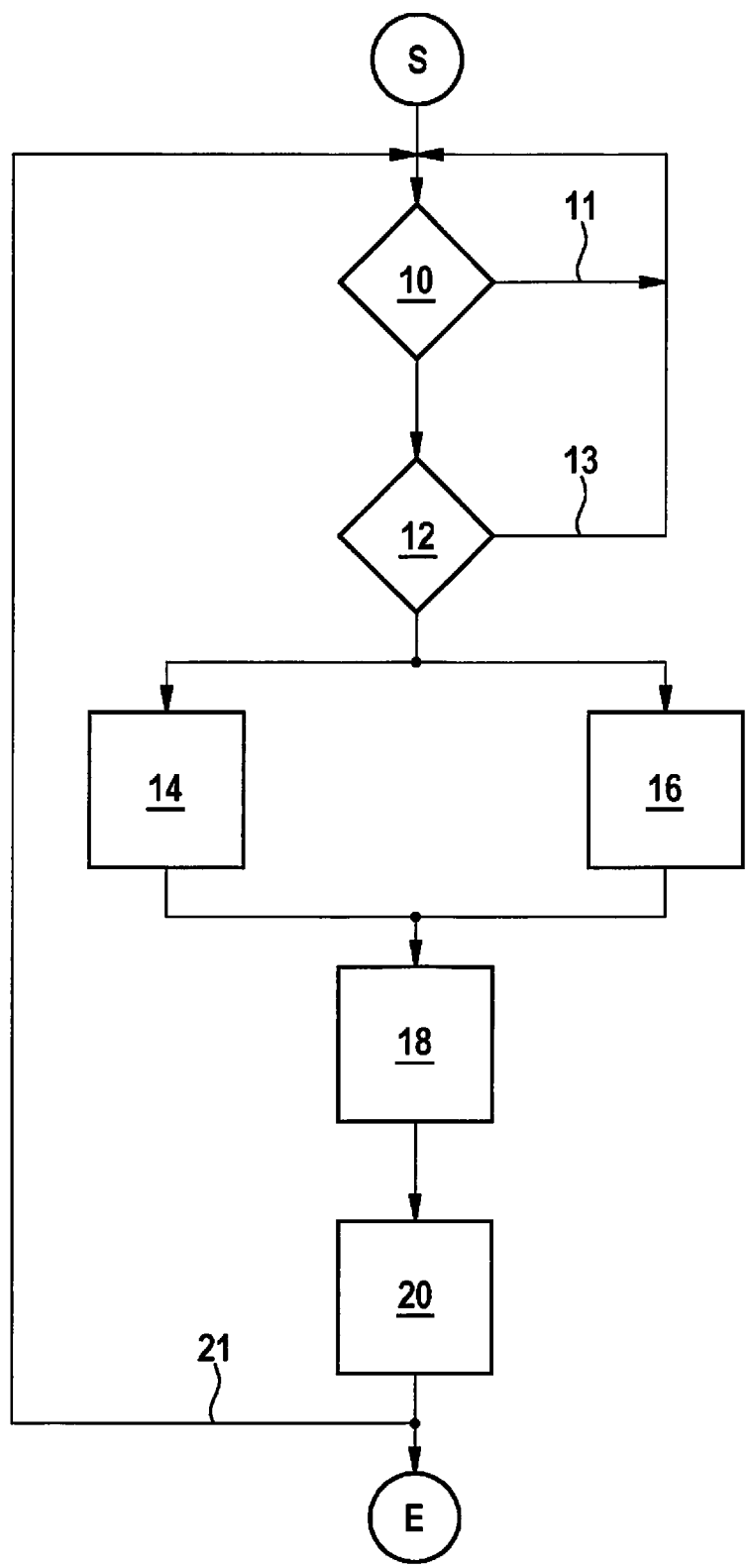
FIG. 1 shows the method of the present invention with the aid of a flow chart.
Figure 2A:
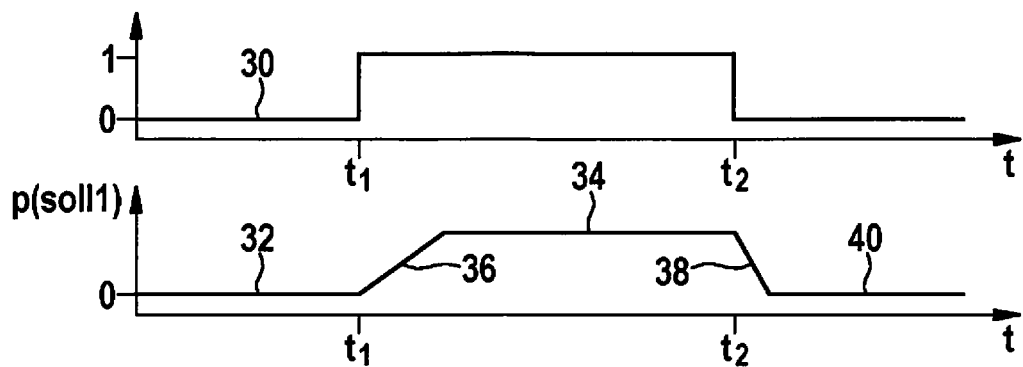
FIG. 2 shows how input signals from the electronic control unit are combined to form a brake pressure setpoint value from which the electronic control unit ultimately generates a control signal for controlling a pressure generator of the electronic traction-slip control device. Diagrams 2a through 2c show signal characteristics over time that are each captured mutually synchronously in time.

Step 14 of the branch of the method on the left in FIG. 1 is based on an input signal 30 (FIG. 2a) representing the braking intention of the driver. This input signal is a binary signal that changes in a step function from a first signal value 0 into a second signal value 1, as soon as the minimum value of an actuating force or of an actuating travel is exceeded or undershot in response to the driver acting on the actuating device. In response to a first signal value change, the electronic control unit sets a first evaluation signal that represents a first setpoint brake pressure characteristic. Based on the level of a first setpoint brake pressure 34 to be adjusted, this setpoint brake pressure characteristic defines the characteristic of a pressure build-up 36 until this first setpoint brake pressure 34 is reached, as well as the characteristic of a pressure reduction 38 down to an initial brake pressure 40. Pressure build-up 36 begins with the change of signal value 0 to signal value 1, while pressure reduction 38 is initiated at a point in time when the input signal representing the braking intention changes back from signal value 1 to signal value 0. Pressure build-up 36 and pressure reduction 38 may have the same or different gradients. In the exemplary embodiment, the respective gradients are constant; likewise fundamentally possible, however, are variable gradients.

Figure 2B:
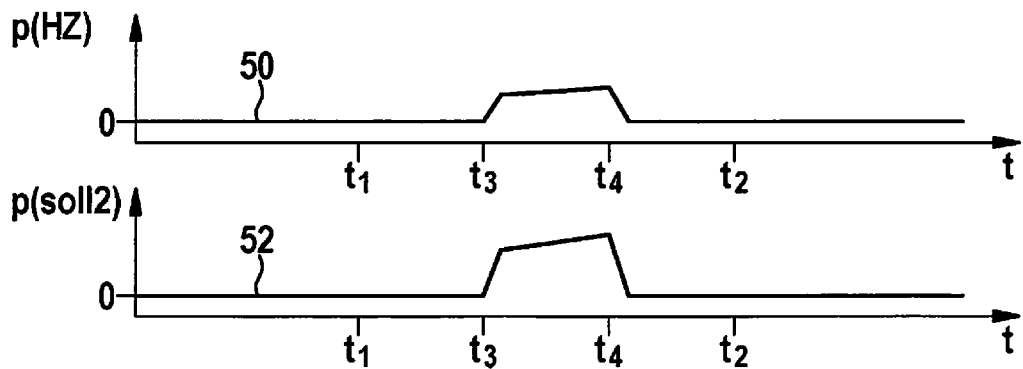

On the other hand, as second input signal 50 (FIG. 2*b*), the brake pressure generated in brake master cylinder 84 (FIG. 1) by the driver actuation underlies the second branch of the method drawn on the left. In accordance with a boost function stored in the electronic control unit, this built-up brake pressure is converted into a second evaluation signal 52, in the form of a second setpoint brake pressure that is increased over the brake pressure in the brake master cylinder.

In step 18 that follows steps 14 and 16, the two evaluation signals 32, 52 ascertained by the electronic control unit are mathematically summed to yield a composite signal 60. Composite signal 60 corresponds to a setpoint brake pressure characteristic which is subsequently converted into an electronic control signal. Finally, pressure generator 88 or the drive thereof are controlled by this control signal.

Subsequently thereto, traction-slip control device 92 supplies a suitable setpoint brake pressure to wheel brakes 86. When working with a functional power brake unit, this brake pressure ideally corresponds at least approximately to the brake pressure generated in response to actuation by the driver. Even the difference between the actuating forces to be exerted by the driver and the pedal response perceived by the driver, on the one hand, from the corresponding magnitudes in the case of undisturbed operation of the vehicle brake system, on the other hand, is hardly noticeable.

The elucidated method ends once step 20 has been performed and, as illustrated by arrow 21, may be restarted at any later point in time.

Figure 2C:
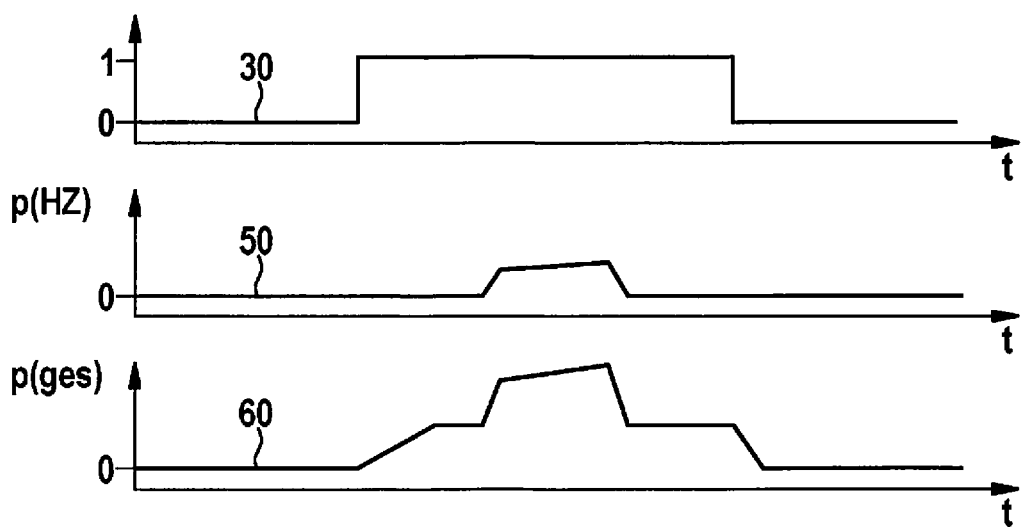

FIG. 2 illustrates the elucidated method on the basis of altogether three diagrams, 2*a*-2*c*. In each case, the signal characteristics shown in diagrams 2*a*-2*c* reproduce the input signals recorded by electronic control unit 90, as well as the evaluation signals generated from these input signals in accordance with the previously described method, as well as the composite signal determined from these evaluation signals. The signal characteristics are thereby each plotted over time, as well as mutually synchronously in time.

Diagram 2*a* illustrates the signal characteristic of first evaluation signal ascertained in step 14, while diagram 2*b* shows the signal characteristic of second evaluation signal 52 determined after step 16. Diagram 2*c* reproduces the signal characteristic of a composite signal 60 generated from the two evaluation signals 32, 52.

On the basis of a binary input signal 30, diagram 2*a* depicts the existing braking intention of the driver. At a point in time t1, this input signal 30 changes in a step function from a signal value 0 to a signal value 1 and, at a second point in time t2, from signal value 1 back to signal value 0.

At point in time t1, the driver has exceeded a minimum actuating force or a minimum actuating travel and thus signals the existing braking intention, while he/she, by actuating the vehicle brake system at point in time t2, undershoots the minimum actuating force or the minimum actuating travel and thus terminates or cancels the braking intention.

Electronic control unit 90 of the traction-slip control device assigns a first evaluation signal 32 stored therein to input signal 30. This evaluation signal 32 corresponds to a pressure characteristic curve over time, whose characteristic is defined by a setpoint brake pressure 34, a pressure build-up 36 until setpoint brake pressure 34 is reached, and a pressure reduction 38 from setpoint brake pressure 34 down to an initial brake pressure 40. All of the enumerated variables may be specifically defined for a particular vehicle and stored in electronic control unit 90. Pressure build-up 36 begins at point in time t1, thus upon the driver exceeding the minimum actuating force or the minimum actuating travel when actuating the actuating device, while a brake pressure reduction 38 begins at point in time t2, i.e., when a minimum actuating travel or a minimum actuating force is undershot by the driver withdrawing an actuation of actuating device 80.

In diagram 2*b*, the brake pressure characteristic is recorded as an input quantity 50 in a pressure chamber of brake master cylinder 84 during an actuation of the vehicle brake system by the driver. A brake-pressure increase in brake master cylinder 84 begins at a point in time t3. The reason for an existing time delay between points in time t1 and t3 is, inter alia, a mechanical play to be overcome at the beginning of an actuation of the vehicle brake system. Within this play, an actuation of the actuating device does not effect any displacement of a cylinder piston within the pressure chamber of brake master cylinder 84, and there is, consequently, also no change in the brake pressure. An existing play improves, inter alia, the controllability of a braking procedure and, moreover, enables adjustment of a vehicle brake system's brake actuation characteristic that is desired by the vehicle manufacturer.

The brake pressure prevailing in the pressure chamber of brake master cylinder 84 begins to be reduced at point in time t4. This point in time t4 resides on the time axis prior to point in time t2 because, at this point in time t4, the driver does, in fact, still actuate the brake pedal or actuating device 80, but has already reduced his/her actuating force before he/she finally undershoots the minimum actuating force or the minimum actuating travel.

Input signal 50 is amplified with the aid of an amplification function stored in the electronic control unit. In accordance with the description, the discussed amplification function is a linear amplification, which, however, is not absolutely necessary. The signal amplified in this manner yields a second evaluation signal 52.

Third diagram 2*c* shows the characteristic of a composite signal 60 generated from the two evaluation signals 32 and 52. The latter is produced by mathematically summing first evaluation signal 32 and second evaluation signal 52 in electronic control unit 90 of the traction-slip control device. The characteristic of composite signal 60 corresponds to a brake pressure setpoint value, which is converted in step 20 in electronic control unit 90 to an electronic control signal and is ultimately used to control a controllable drive of a pressure generator 88 of the vehicle brake system. Accordingly, the pressure generator produces a brake pressure, whose pressure characteristic substantially corresponds to the characteristic of composite signal 60. Input signals 30 and 50 illustrated in diagram 2*c* correspond to those of diagrams 2*a* and 2*b* and are shown again merely for the sake of simpler understanding.

It is self-evident that it is conceivable to modify or amend the described exemplary embodiment without departing from the fundamental idea underlying the present invention.

What is claimed is:

1. A method for boosting a braking force in an electronically slip-controllable vehicle brake system that includes an actuating device that is able to be acted upon by a driver, a power brake unit for boosting a driver-applied actuating force, a brake master cylinder that is able to be acted upon by the power brake unit, a wheel brake that is connected to a brake master cylinder, and an electronic traction-slip control device for modulating a brake pressure of the wheel brake, an electronic control unit, and a pressure generator that can be activated by an electronically controllable drive unit, the pressure generator being associated with the traction-slip control device, the method comprising:
- recording a first input signal that signals an existing braking intention;
- converting the first input signal into a first evaluation signal by the electronic control unit;
- recording a second input signal that represents a brake pressure in a pressure chamber of the brake master cylinder;
- converting the second input signal into a second evaluation signal; and
- mathematically summing the first evaluation signal and the second evaluation signal in order to ascertain a composite signal, which, by electronically controlling the pressure generator accordingly, the traction-slip control device sets as the brake pressure.

2. The method as recited in claim 1, wherein the converting is performed in response to an existing malfunction of the power brake unit.

3. The method as recited in claim 1, wherein the first input signal is recorded by a first sensor that is associated with the actuating device.

4. The method as recited in claim 3, wherein the first sensor is one of a force sensor and a position transducer.

5. The method as recited in claim 3, wherein a malfunction of the power brake unit is inferred on the basis of an existing travel difference between an actuating travel of the actuating device and a deflection movement of a booster element of the power brake unit.

6. The method as recited in claim 1, wherein the first input signal is a binary signal having a signal value that changes in a step function into a second other signal value when a predefinable threshold value is exceeded or undershot in response to actuating the actuating device.

7. The method as recited in claim 1, wherein:
- the electronic control unit converts the first input signal into the first evaluation signal,
- the first evaluation signal corresponds to a brake pressure setpoint value, a pressure build-up until the brake pressure setpoint value is reached, and a pressure reduction down to an initial brake pressure.

8. The method as recited in claim 1, wherein the second input signal is supplied by a second sensor that is assigned to the brake master cylinder and records a driver-generated brake pressure in the brake master cylinder.

9. The method as recited in claim 8, wherein:
- the second evaluation signal is generated from the second input signal in accordance with a mathematical function stored in the electronic control unit, and
- the second evaluation signal represents a setpoint brake pressure having a value that is higher than the driver-generated brake pressure in the brake master cylinder.

10. An electronically slip-controllable vehicle brake system that includes an actuating device that is able to be acted upon by a driver, a power brake unit for boosting a driver-applied actuating force, a brake master cylinder that is able to be acted upon by the power brake unit, a wheel brake that is connected to a brake master cylinder, and an electronic traction-slip control device for modulating a brake pressure of the wheel brake, an electronic control unit, and a pressure generator that can be activated by an electronically controllable drive unit, the pressure generator being associated with the traction-slip control device, wherein the electronic control unit controls the pressure generator in accordance with a method comprising:
- recording a first input signal that signals an existing braking intention;
- converting the first input signal into a first evaluation signal by the electronic control unit;
- recording a second input signal that represents a brake pressure in a pressure chamber of the brake master cylinder;
- converting the second input signal into a second evaluation signal; and
- mathematically summing the first evaluation signal and the second evaluation signal in order to ascertain a composite signal, which, by electronically controlling the pressure generator accordingly, the traction-slip control device sets as the brake pressure.

* * * * *